United States Patent

[11] 3,618,963

| [72] | Inventor | Antonio Romano<br>c/o Ice Capades 6121 Santa Monica Blvd,<br>Los Angeles, Calif. 90038 |
|---|---|---|
| [21] | Appl. No. | 873,613 |
| [22] | Filed | Nov. 3, 1969 |
| [45] | Patented | Nov. 9, 1971 |

[54] ICE BICYCLE
13 Claims, 8 Drawing Figs.

[52] U.S. Cl. ........................................ 280/7.12,
180/6, 280/12.14
[51] Int. Cl. ........................................ B62k 13/00
[50] Field of Search .......................... 180/12.14,
12.13, 714, 7.12, 12.1, 8, 6.1, 6

[56] References Cited
UNITED STATES PATENTS

| 529,371 | 11/1894 | Fahrig ........................ | 280/12.14 X |
| 764,442 | 7/1904 | Erickson et al. ............ | 280/12.14 X |
| 1,635,292 | 7/1927 | Smith et al. ................. | 280/7.14 |

*Primary Examiner*—Leo Friaglia
*Assistant Examiner*—Milton L. Smith
*Attorney*—Flam and Flam

ABSTRACT: A runner band is applied over the front wheel of a bicycle. The runner band has a skate edge for movement along an ice surface. A combined track and runner band is applied to the rear wheel of the bicycle, one part of the band having teeth for biting into the skate surface whereby suitable traction may be applied for propelling the bicycle. Another small part of the band is provided with skate parts. Accordingly, when it is desired to skate, the wheel is stopped at the runner part of the band.

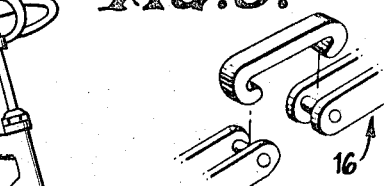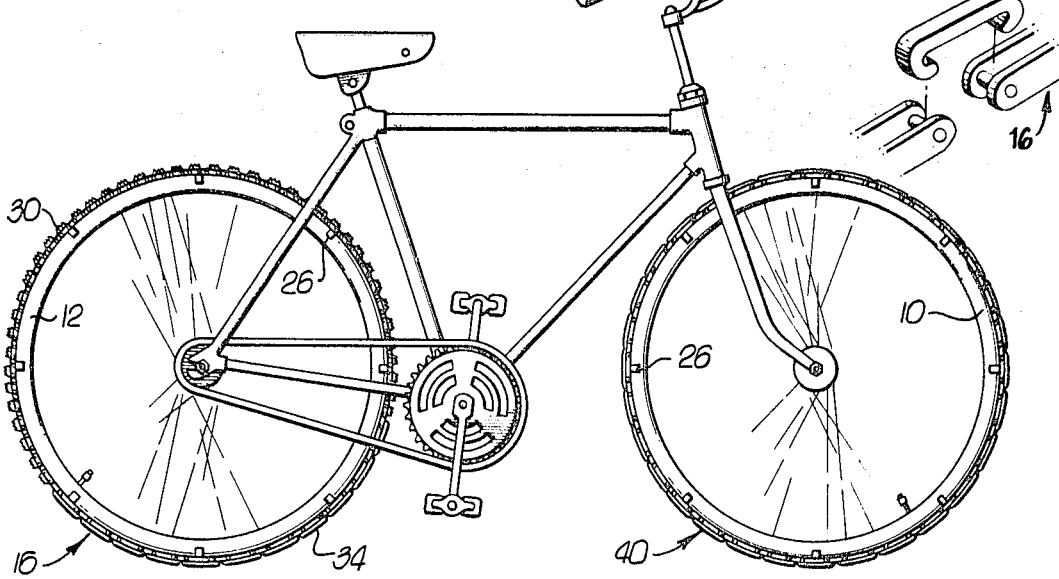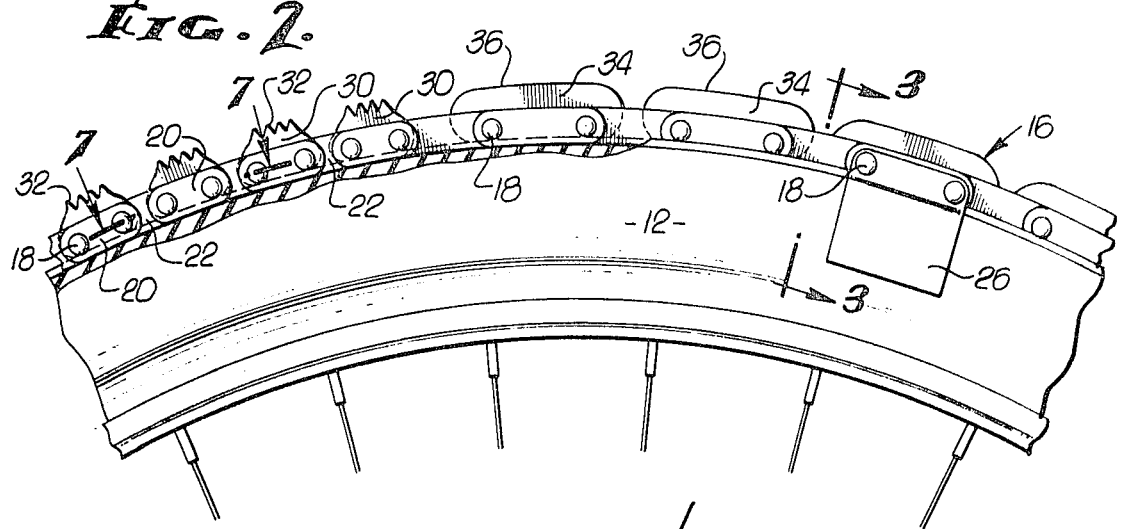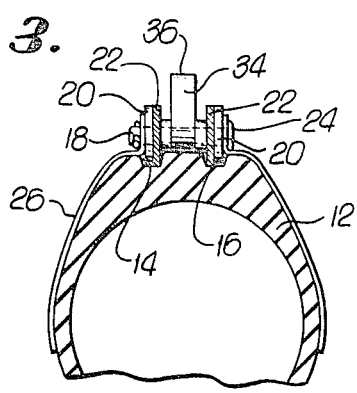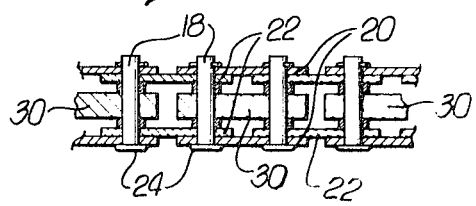

INVENTOR.
ANTONIO ROMANO

By
Flam and Flam
ATTORNEYS.

1

ICE BICYCLE

FIELD OF THE INVENTION

This invention relates to bicycles and, particularly, to a bicycle designed for use by a performing artist on ice. The bicycle may also be used on hard-packed snow. Various attachments have been provided in the past for converting a bicycle to a sled-type vehicle. Other special vehicles have been designed for propulsion on ice. The previously known attachments and the previously known specially designed vehicles would at once be recognized by an audience as something materially different from a conventional bicycle.

The primary object of this invention is to provide a simple attachment to a conventional vehicle whereby an illusion may be created that the performer indeed is operating a substantially conventional bicycle on an ice surface. Accordingly, the attachment must be simple and relatively inconspicuous. Despite these essential characteristics, the attachment must be fully capable of two modes of operation, one tracking and the other skating or running.

BRIEF SUMMARY OF THE INVENTION

In order to achieve an ice bicycle having these characteristics, I provide two bands, one to be applied over the front tire of bicycle, and one to be applied over the rear tire of the bicycle. The front band has a skate surface throughout its entire periphery. The rear band is provided with a track part throughout the major portion of its circumference and a skate part throughout the remainder. Accordingly, by practiced pedipulation, the bicycle can be operated skillfully. The bicycle can be propelled by a process in which a slight lost motion occurs during each revolution of the rear wheel. After sufficient forward motion is achieved, the rear wheel is stopped at a position where the skate part of the band is in engagement with the ice.

The bicycle operates as a skate the path of which is controlled by a combination of turning the front wheel and by suitably moving the center of gravity to one side or the other.

The bicycle can be stopped by abruptly turning the front wheel to a position in which the skate edge digs into the ice. Optionally, the bicycle can be stopped by operating the pedals until the track part of the rear band is operative and reversing the torque on the pedals.

In a preferred embodiment of the invention, the bands are in the form of flexible chains that are readily attached and detached from the wheels of the bicycle by inflating and deflating the tires.

BRIEF DESCRIPTION OF THE DRAWINGS

A detailed description of the invention will be made with reference to the accompanying drawings. These drawings are to scale. The description of the invention is of the best presently contemplated modes of carrying out the invention. This description is not to be taken in a limiting sense, but is made merely for the purpose of illustrating the general principles of the invention. Structural and operational characteristics attributed to forms of the invention first described shall also be attributed to forms later described, unless such characteristics are obviously inapplicable or unless specific exception is made.

FIG. 1 is a side elevational view of a bicycle incorporating the present invention.

FIG. 2 is an enlarged view showing a portion of the rear band, a portion of the tire being broken away and shown in section.

FIG. 3 is a fragmentary sectional view taken along a plane corresponding to line 3—3 of FIG. 2.

FIG. 7 is an enlarged longitudinal sectional view taken along a plane corresponding to line 7—7 of FIG. 2.

FIG. 8 is an isometric view of a C-shaped unit used to provide a closure link in the chain.

DETAILED DESCRIPTION

Figure 4:
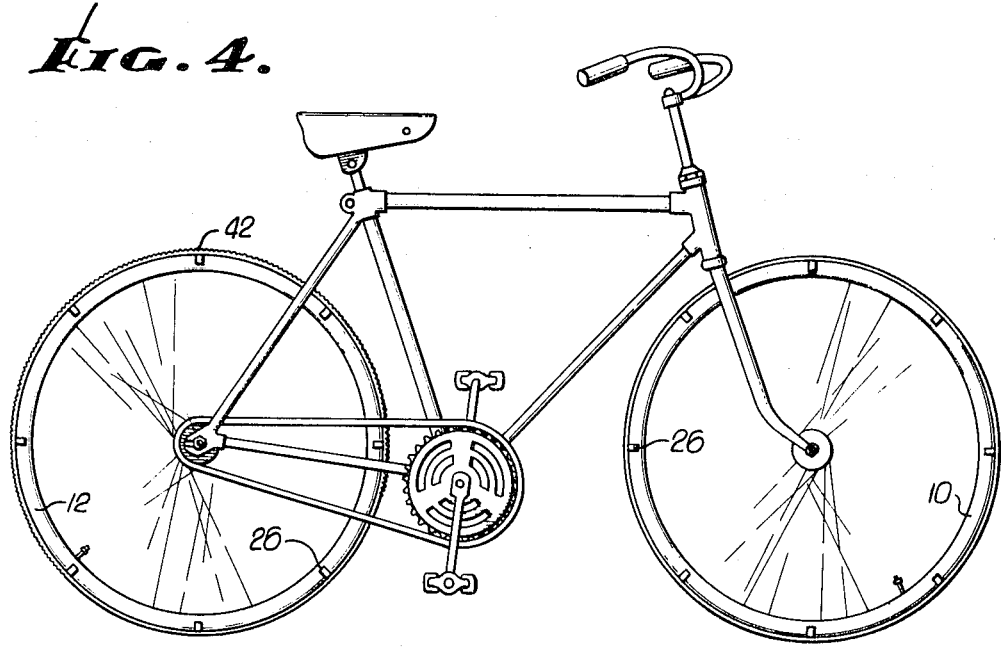
FIG. 4 is a side elevational view of a bicycle incorporating a modified form of the present invention.

The bicycle shown in FIG. 1 has convention front and rear inflatable tires 10 and 12. Preferably, these tires have a tread providing uninterrupted circular grooves 14 and 16 (FIG. 3). An endless chain 16 is applied to the periphery of the rear wheel. The chain has a series of link pins 18 (see also FIG. 7) for connecting pairs of outer links 20 to pairs of inner links 22 in endless succession. The pins have heads 24 to prevent lateral separation of the links. One of the pins (FIG. 3) may be removably held in place by a cotter pin or a snap ring so that the chain may be broken for purposes of attachment and detachment. Alternately, a C-shaped unit (FIG. 8) may be used to provide a closure link in the chain. In this instance, pins at ends of the chain may be removably received in the recess provided by the closure link and held seated by tension in the chain.

As shown in FIG. 3, some of the links fit the tire grooves 14 and 16. Accordingly, the chain is well stabilized, especially when the tire is adequately inflated. Several pairs of arcuate keepers 26 are provided that are attached to the outside surfaces of some of the links. These keepers extend along the sides of the tire and serve to keep the chain safely in place in the event of the tire puncture.

Along approximately two-thirds of the length of the chain 16 for the rear tire are a series of traction elements 30 linked into the chain. Theses traction elements for purposes of convenience are mounted at the chain sections defined by the outside links 20 and as shown in FIG. 7. The traction elements have holes at opposite ends engaged by the chain pins 18. Since the chain is completed by the inner and outer links 20 and 22 independently of the traction elements, a break in any traction element will not disrupt the continuity of the chain. However, teeth could also be provided in the links 20 and 22.

Each of the traction elements 30 has a set of sharp teeth 32 designed to bite into the ice surface to provide traction. Accordingly, the teeth 32 project radially outwardly beyond the links 20 and 22. The closure link, if used, may have teeth or it may be smooth according to its position in the chain.

Skid or skate elements 34 are carried at the remainder of the chain periphery. These skid or skate elements are mounted in the same manner as the traction elements and similarly linked into the chain. The skid elements 34 provide narrow smooth skating surfaces 36 (FIG. 3) located approximately on the same circle as the teeth of the traction elements. Accordingly, there is no substantial change in the vertical position of the wheel as different parts of the chain move into operative position. The skid elements 34 are short enough so that they can be straight and yet conform almost precisely to a circular configuration. The larger the bicycle, the longer the skate elements can be. The traction elements, however, are kept short since their engagement is more critical. Since traction is a function of the number to individual elements per unit length, as well as the length of the individual units, a large number of traction elements is desirable.

The front tire 10 carries an endless chain 40. It is identical to the rear chain except that skid elements only are provided. Both chains are readily installed and removed by just deflating the tires. The art of riding the bicycle is mastered after a certain amount of practice.

Figure 5:
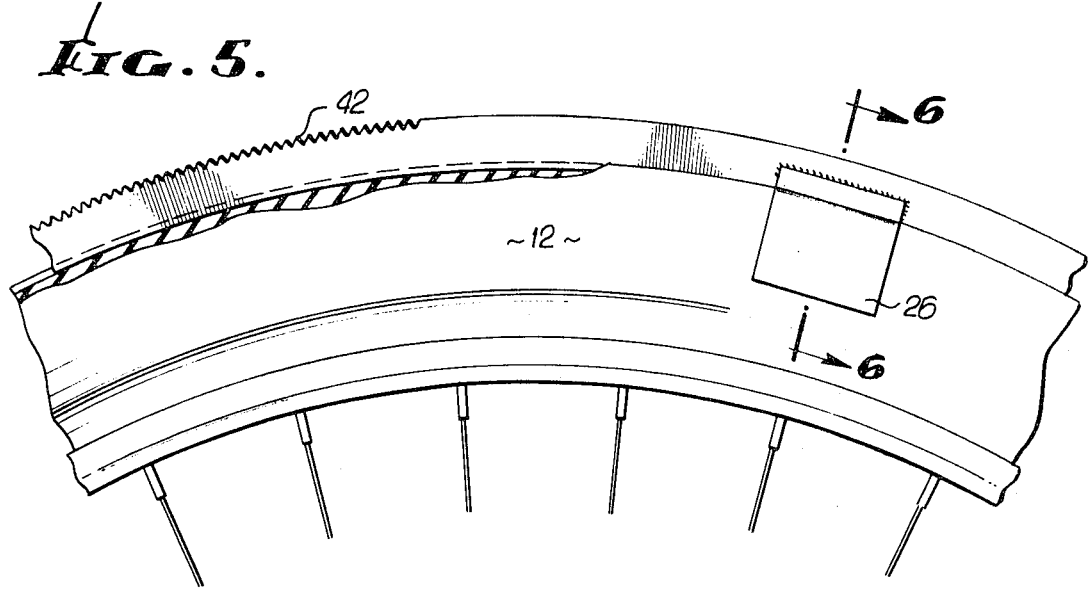
FIG. 5 is an enlarged fragmentary elevational view of a portion of the rear band, part of the tire being broken away and shown in section.
Figure 6:
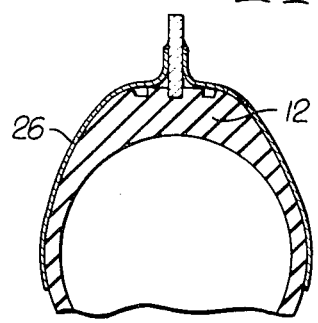
FIG. 6 is a sectional view taken along a plane corresponding to line 6—6 of FIG. 5.

In the form shown in FIGS. 4, 5 and 6, the band for each wheel is formed as a single-circular element. The rear band is machined to provide teeth 42 (FIG. 5) throughout approximately two-thirds the circumference as shown in FIG. 4. The bands may be formed as two or three sections to facilitate placement about the bicycle tires as desired. As in the previous form, the band fits in the tire groove (FIG. 6) for achieving lateral stability.

I claim:

1. In a bicycle having a front wheel and a rear wheel and inflatable tires on each wheel for tracking along a ground surface, the combination therewith of:
   a. a front runner band designed to extend circumferentially of the front wheel along the crest of the front tire, said runner band having along its entire length, surface means for skidding or skating; and
   b. a rear combined runner-traction band designed to extend circumferentially of the rear wheel along the crest of the rear tire, said runner-traction band having, along one part of its length, surface means for skidding or skating and having along another part of its length, projections designed to bite into the ice surface;
   c. no part of either of said bands projecting beyond a circle located substantially at said surface means.

2. The apparatus as set forth in claim 1 which said bands when attached to said front and rear wheels for operation have no parts movable relative to their respective wheels.

3. Apparatus for converting a bicycle into an ice vehicle, said bicycle having a front wheel and a rear wheel:
   a. a short runner band designed to extend circumferentially of and to be attached to, the front wheel, said runner band having along its entire length, surface means for skidding or skating; and
   b. a rear combined runner-traction band designed to extend circumferentially of and to be attached to, the rear wheel, said runner-traction band having, along one part of its length, surface means for skidding or skating and having along another part of its length, projections designed to bite into an ice surface;
   c. said bands having, at their radially inward portions, configurations to fit into peripheral grooves of inflatable tires of said bicycle for laterally stabilizing said bands on said bicycle wheels.

4. Apparatus for converting a bicycle into an ice vehicle, said bicycle having a front wheel and a rear wheel:
   a. a short runner band designed to extend circumferentially of and to be attached to, the front wheel, said runner band having along its entire length, surface means for skidding or skating; and
   b. a rear combined runner-traction band designed to extend circumferentially of and to be attached to, the rear wheel, said runner-traction band having, along one part of its length, surface means for skidding or skating and having along another part of its length, projections designed to bite into an ice surface;
   c. said bands being in the form of endless chains, said surface means being in the form of skid or skate elements located between links of the chain, said projections being formed as teeth on traction elements located between links of the rear chain.

5. The apparatus as set forth in claim 4, in which peripheral chain tension is independent of said traction elements and said skid or skate elements.

6. The apparatus as set forth in claim 4 in which a C-shaped closure link is provided for detachably connecting the ends of the chain.

7. Apparatus for converting a bicycle into an ice vehicle, said bicycle having a front wheel and a rear wheel:
   a. a short runner band designed to extend circumferentially of and to be attached to, the front wheel, said runner band having along its entire length, surface means for skidding or skating; and
   b. a rear combined runner-traction band designed to extend circumferentially of and to be attached to, the rear wheel, said runner-traction band having, along one part of its length, surface means for skidding or skating and having along another part of its length, projections designed to bite into an ice surface;
   c. said bands being in the form of endless chains, alternate sections of each chain being defined by a pair of spaced side-by-side links;
   d. said surface means being in the form of skid or skate elements located between said pairs of links of the front chain and some of said pairs of links of the rear chain;
   e. said projections being formed as teeth on traction elements located between other pairs of links of said rear chain.

8. The apparatus as set forth in claim 7 in which said chain has links having a width designed to fit peripheral grooves of front and rear inflatable tires to provide lateral stability.

9. The apparatus as set forth in claim 8 together with pairs of arcuate keepers attached along the length of said bands.

10. The apparatus as set forth in claim 7 in which the teeth of said traction elements for said rear chain are located along a circle that falls substantially at the surface of said skid elements whereby the vertical position of said rear wheel remains substantially the same as different sections of said rear chain move into operative position.

11. The apparatus as set forth in claim 7 in which no part of either of said bands projects substantially beyond a circle located substantially at the surface of said skid elements, said teeth of said traction elements falling substantially at the circle defined by the skid elements of said rear chain.

12. An ice conversion kit comprising a pair of link chains for converting a bicycle into an ice vehicle, said bicycle having a front wheel and a rear wheel, both of said wheels having inflatable tires;
   a. one of said chains being designed to extend entirely around the outside of the tire of the front wheel and at the crest of the tire, and one chain having along its entire length, elements linked in to the chain having surfaces for skidding or skating; and
   b. the other of said chains being designed to extend around the outside of the tire of the rear wheel and at the crest of the tire, said other chain having along one part of its length, elements linked into the chain having surfaces for skidding or skating and having along another part of its length, elements linked into the chain having projections designed to bit into an ice surface.

13. The apparatus as set forth in claim 12, in which said front and rear chains have means for laterally stabilizing said chains on the crests of said inflatable tires.

* * * * *